(12) United States Patent
Perry

(10) Patent No.: US 8,361,505 B1
(45) Date of Patent: Jan. 29, 2013

(54) METHOD AND APPARATUS FOR PRODUCING A STABLE SUB-COLLOIDAL NANO-PHASE SILVER METAL HYDROSOL

(76) Inventor: Stephen C. Perry, Norwood, MA (US)

( * ) Notice: Subject to any disclaimer, the term of this patent is extended or adjusted under 35 U.S.C. 154(b) by 1483 days.

(21) Appl. No.: 11/427,050

(22) Filed: Jun. 28, 2006

(51) Int. Cl.
*A61K 9/14* (2006.01)

(52) U.S. Cl. ........................................ 424/489
(58) Field of Classification Search ............ None
See application file for complete search history.

(56) References Cited

FOREIGN PATENT DOCUMENTS

| | | | |
|---|---|---|---|
| WO | WO 2004112997 A1 | * | 12/2004 |
| WO | WO 2006/074117 | * | 7/2006 |

* cited by examiner

*Primary Examiner* — Paul Dickinson
(74) *Attorney, Agent, or Firm* — Malin Haley DiMaggio & Bowen, P.A.

(57) ABSTRACT

An apparatus and method for the preparation and formation of a stable sub-colloidal-sized silver metal hydrosol in pure distilled water without the use of supporting or stabilizing proteins, carbohydrates, or similar types of ligands. The silver metal hydrosol is created by passing an alternating current, high-voltage arc discharge between two pure silver electrodes. The discharge arc passes from a silver wire suspended above the distilled water working fluid, first through the air, and then through the working fluid to a submerged silver plate, thereby completing the circuit. With the passage of the discharge arc through the silver wire, a quantity of the silver metal is deflagrated from the bulk surface of the metal and is vaporized into silver metal atoms, or aggregates of atoms, dispersed into the air. The vaporized silver metal atoms are rapidly quenched into separate atoms or aggregates upon making contact with the cooled working fluid.

4 Claims, 1 Drawing Sheet

METHOD AND APPARATUS FOR PRODUCING A STABLE SUB-COLLOIDAL NANO-PHASE SILVER METAL HYDROSOL

BACKGROUND OF THE INVENTION

1. Field of the Invention

The present invention pertains generally to a method and apparatus for the formation of silver-containing products for medicinal uses and, more particularly, to a method for the production of a stable, non-ionic form of extremely minute "sub-colloidal" particles of pure silver metal in distilled water without the use of any type of added electrolytes or other supportive ligand materials.

2. Description of Related Art

One of the more intriguing and historical, non-industrial uses for silver is found in pharmaceutical and medicinal applications in which the metal, in various forms, has been used by mankind throughout recorded history. Abundant reference is made to colloidal silver products in ancient Egyptian, Greek, and Roman texts. During the plagues in Europe, the royal families prevented infection by collecting and maintaining water stores in silver vessels. In the past, silver miners filed bulk silver into dust, placed the dust into water to settle, and (after decantation) used the resulting silver-loaded clear water for the prevention of diseases. Moreover, the United States Pharmatocopea (USP) and National Formulary (NF) of the late nineteenth and early twentieth centuries contain multiple listings and formulae for silver-containing liquids and creams, most of which were based upon protein-supported and carbohydrate-supported silver-containing materials. All of these materials were formed from stabilized precipitates of silver in an ionic form.

Currently, the United States Navy distributes various anti-microbial creams and lotions compounded with and based upon protein-supported silver precipitates to sailors going on shore leave. Diluted solutions of ionic silver nitrate ("lunar caustic") are applied to the eyes of newborn babies throughout the United States. The market literally abounds with solutions of high-concentration (100 to more than 2,000 parts per million) colloidal silver products as well as various types of low voltage DC battery devices for making silver colloids for personal use. Conventional colloidal silver preparations, of which mention can be found in the available literature, are based upon some form of an ionic silver moiety, rather than the un-ionized or non-ionic form of the finely divided base silver metal. These conventional silver preparations also require relatively large amounts of silver content to be effective as an anti-microbial composition. Moreover, the pure silver particles in typical colloidal silver suspensions are too large to be absorbed by human tissue. Many conventional silver preparations contain large quantities of ionic silver in the form of silver salts. Use of such silver preparations can result in agyria, an abnormal condition in which the body excessively absorbs silver salts and deposits them in the tissues. Symptoms of agyria include permanently discolored gray skin and mucous membranes.

A current need exists for a stable, nano-phase, sub-colloidal, non-ionic silver metal hydrosol composition that acts effectively as an anti-microbial and antifungal agent while containing small quantities of silver.

SUMMARY OF THE INVENTION

The present invention describes a method and apparatus for producing a stable sub-colloidal nano-phase silver metal hydrosol in which the electrical elements are physically positioned so that a discharge arc passes from a silver wire-shaped electrode suspended above a container of distilled water working fluid, first through the air, and then through the working fluid to a submerged silver plate-shaped electrode to complete the electrical circuit.

The invention also describes the operational electrical requirements whereby a high voltage alternating current arc discharge between the electrodes supplies the necessary energy for the production of the sub-colloidal silver moiety.

Lastly, the stable, non-ionic, non-reactive, sub-colloidal, nano-phase silver metal hydrosol composition is described. Said composition is used in various ingestible and topically applied forms as an anti-microbial and antifungal agent to rapidly kill bacteria, molds, yeasts, and other fungi.

The term "sub-colloidal" as used herein refers to nano-particles or nano-phase particles, which are smaller than conventional colloidal particles. The terms "nano-particle" or "nano-phase particle," either in the singular or plural form, refer to particles sufficiently small enough to require measurement in nanometers or billionths of a meter.

An object of the present invention is to provide thermodynamically-controlled conditions whereby a sub-colloidal sized silver metal hydrosol can be formed.

Another object of this invention is to provide a method for maintaining the silver metal hydrosol so formed in a naturally stabilized state in pure distilled water without the use of supporting or stabilizing proteins, carbohydrates, or similar types of ligands.

Still another object of this invention is to provide a stable, non-reactive, nano-phase, sub-colloidal, non-ionic silver metal hydrosol composition that acts effectively as an anti-microbial and antifungal agent while containing small quantities of silver.

Yet another object of this invention is to provide a stable, non-reactive, non-ionic, sub-colloidal, nano-phase silver metal hydrosol composition having nano-particles sufficiently small enough in size to be absorbed by human tissue but being non-ionic in nature to preclude excessive absorption as silver salts that may cause tissue discoloration.

In accordance with these and other objects which will become apparent hereinafter, the instant invention will now be described with particular reference to the accompanying drawings.

DETAILED DESCRIPTION

Figure 1:
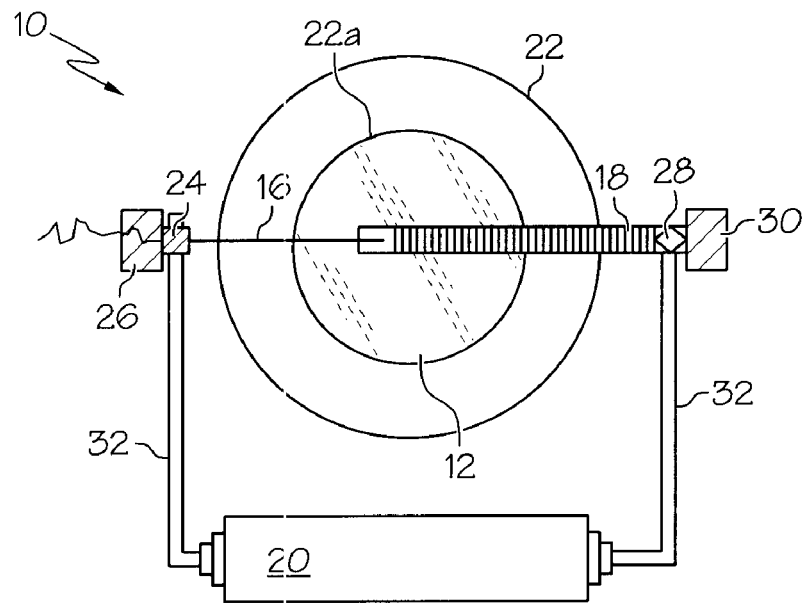
FIG. 1 shows a top plan view of the general layout of the electrical connection and working equipment without, as well as the nominal level of the working fluid and positioning of the wire-shaped and plate-shaped chair electrodes within the apparatus.
Figure 2:
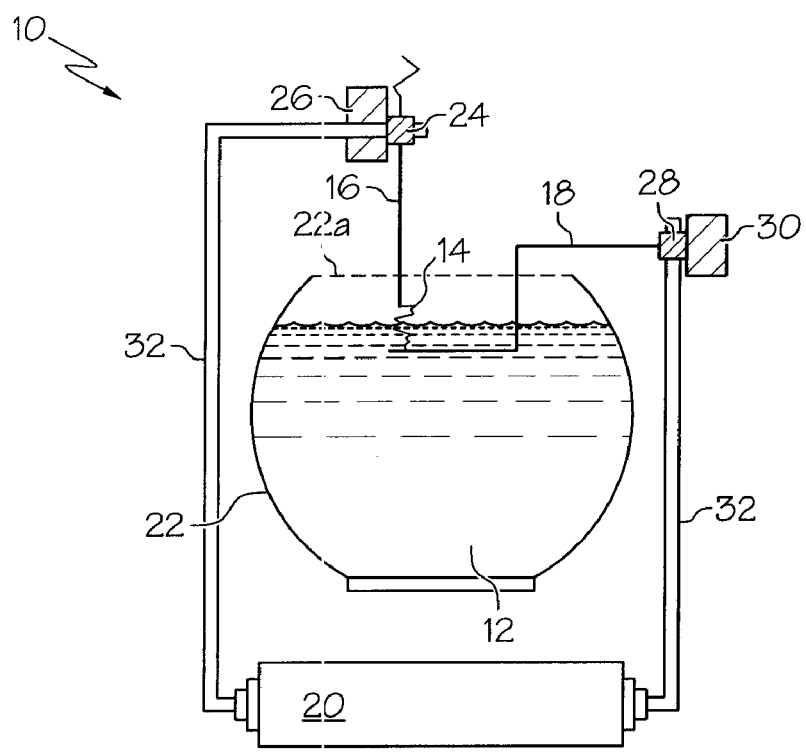
FIG. 2 shows a side elevational view of the general layout of the electrical connection and working equipment without, as well as the nominal level of the working fluid and positioning of the wire-shaped and plate-shaped chair electrodes within the apparatus.

As illustrated in FIGS. 1 and 2, the present invention relates to a method and apparatus 10 for the production, in high purity distilled water 12, of un-reactive, neutral, sub-colloidal nano-sized silver metal particles ("hydrosols") by the passage of a high-voltage alternating current discharge arc 14 between two silver electrodes 16 and 18. One of said silver electrodes is a wire-shaped electrode 16 suspended above the water 12 and the other silver electrode is a submerged plate-shaped electrode 18 completing the circuit. The present invention further describes the general state of and thermodynamically controlled conditions concerning the actual physical, chemical, and mechanical requirements and conditions of operation of the materials and equipment that must utilized in the process for the production of this specific type of silver moiety. The present invention also describes the physical positioning of the electrical elements and the operational requirements of the arc discharge between the electrodes, both of which are necessary for the production of the sub-colloidal silver moiety.

The purity of both the water and silver metal electrode materials must be of the highest quality. The presence of extraneous gases or ions in the water is immediately affective in the process, causing a residual precipitation to form. Metallic impurities in the silver may lead to a lack of stability of the resultant hydrosol due to the catalytic effects of said impurities. Water quality must be equivalent to or exceed laboratory reagent grade of triply distilled 50+ megohm water, and silver quality must be at least 99.9995%, with a resistivity less than or equal to $1.7 \times 10^{-6}$.

The required discharge conditions of the arcing system 10 can be achieved with any of the various transformer units 20 in the ballasts of ordinary fluorescent-types of lamp fixtures having multiple banks of eight foot (or longer) bulbs. The range required for this invention is 14,000 to 18,000 volts, from a primary of 120V and 2 A.

The wire-shaped electrode 16 used must be B&S #10 or larger, of sufficient length (beyond the contact point) to provide a maximum resistance of 0.0010 ohms (about 12 inches), and should extend out of the equipment for attachment to the transformer.

The plate-shaped electrode 18 will have a nominal thickness of 0.075 inches to 0.100 inches, width of 0.75 inches to 1.00 inch, and length of 10 inches to 12 inches. The plate-shaped electrode is bent into a "chair" form with a length sufficient to extend out of the equipment for attachment to the transformer.

The operational electro-unit container must be a vessel 22 with a relatively wide mouth 22a to allow insertion of electrical contact electrodes 16 and 18, as well as to prevent the accumulation of excessive amounts of ozone with concomitant oxidization of the product. The physical size, shape, and dimensions of the actual vessel unit 22 are somewhat variable. In this current research, an ordinary large household fish bowl was used. Said vessel has a volume of roughly 3.0 gallons, a maximum diameter of 12 inches, and an opening 8.0 inches in diameter for inserting the equipment.

The working fluid (high purity water) 12 must rise to a level within 2.5 to 3.0 inches from the wide mouth rim 22a. This level must be maintained throughout the operation with the slow, gradual addition of water through an ordinary wash bottle that is fitted with a long nozzle with a rubber capped assembly to prevent entry of air.

The physical placement and positioning of the electrode elements 16 and 18 within the vessel 22 are of the greatest importance. The contact surface of the large solid plate-shaped silver electrode 18 must be fully immersed from between 0.50 to 0.75 inches beneath the surface of the water 12, parallel to its surface, and firmly fixed in place (this electrode will not be moved). The smaller wire-shaped silver electrode 16 must be suspended above and perpendicular to the surface of the water 12 (and the plate-shaped electrode 18) down through the wide mouth 22a of the vessel 22. Said wire-shaped electrode 16 must be capable of being moved in the direction of the plate-shaped electrode 18 as the arc 14 is started, slowly removed to the proper arc length position, and again moved towards the plate-shaped electrode as the deflagration of the wire is underway. An electrical contact 24 attached to a variable, height-adjustable support structure 26 is used to connect to the wire-shaped electrode 16 to alter said electrode's position relative to the surface of the water 12 and the plate-shaped electrode 18. The support structure 26 is used to control the movement of the wire-shaped electrode 16 within the vessel 22. The plate-shaped electrode 18 is connected to an electrical contact 28 attached and supported by a fixed support structure 30.

The connector leads 32 connecting the transformer 20 to the electrical contacts 24 and 28, and thus, to the electrodes 16 and 18, must be heavily shielded B&S #8 copper wires, double-wrapped with Mylar plastic shielding, and further wrapped with black electrical tape. All connections must be formed with thick copper conductors and heavy-duty shielded copper connectors.

In this invention, to cause the specific formation of the atomic aggregates, the electrical deflagration rate of the silver wire-shaped electrode must be accurately controlled. This control of the electrical deflagration rate is accomplished by setting and maintaining the distance between the two silver electrodes within a certain range (fitting the actual and specific conditions of operations of the unit in place). The deflagration rate is best quantized by the actual measurement of the weight loss of the silver wire per unit time.

The recorded rate of the loss of weight of the silver must be maintained between 0.940 to 0.950 grams (940 to 950 mg) over a period of 250 to 275 minutes. This rate is equivalent to a rate of loss of length of approximately 0.25 inches of silver wire (or a weight loss of 225 to 250 mg) per hour.

The arc 14, when initially formed, must be drawn away from the plate-shaped electrode 18 to a position approximately 0.50 inches above the surface of the working fluid 12. As the action continues (and after environmental parameters are stabilized), the arc is extended until extinguished and the separation distance at extermination estimated. The exact separation varies with each system, and therefore, must be determined empirically with the calculation of silver losses. The separation distance (or full length of the arc 14) usually varies from 1.25 to 1.50 inches from the face of the plate-shaped electrode to the wire point.

Due to physical (resistance) and chemical changes occurring under continuous discharge conditions, the operation requires minimal cooling of the vessel 22 as well as minimal venting of the ozone produced from the passage of the arc 14 through the air portion of the discharge. The physical and environmental control of the conditions of operation is necessary for the formation process. An ordinary ice/water slush or a commercial chilling system can be used to cool the working fluid and maintain the temperature below 1000 degrees Fahrenheit, and a gentle breeze maintained (with an ordinary 6 to 8 inch house fan or any air source capable of moving 20-25 cfm (cubic feet per minute) of air) over the surface of the wide mouth rim 22a of the vessel 22 will suffice to prevent excessive oxidization of the silver product.

An unexpected result of the present invention is that the silver metal hydrosol produced by the apparatus described herein is an effective anti-microbial agent even when used in minute quantities. Testing has proven the silver metal hydrosol to be effective in killing bacteria, including but not limited to *Staphylococcus aureus, Staphylococcus epidermidis*, methecillin-resistant *Staphylococcus aureus, Escherichia coli, Pseudomonas aeruginosa, Pseudomonas fluorescens, Klebsiella pneumoniae, Clostridium difficile, Salmonella ent., Salmonella typhi.*, and *Helicobacter pylori*. Several species of yeast, including but not limited to *Candida albicans* and *Zygosaccharomyces bailii*, and mold, including but not limited to *Aspergillus niger*, are also killed by the composition. The silver metal hydrosol composition has been tested by exposing these organisms to said composition at intervals of 10, 30, and 60 minutes. Generally, the test results have demonstrated non-detection of the infectious organism (or complete kill) within one hour of introduction of the composition.

The silver metal hydrosol is a nano-phase, sub-colloidal composition comprising atoms or aggregates of atoms of pure silver suspended in pure distilled water. In the preferred embodiment of the invention, pure distilled water is the working fluid used to create the silver metal hydrosol solution. Both the silver metal and the pure distilled water are preferably pure and free of impurities. The silver metal hydrosol is a stable, non-reactive, non-ionic, sub-colloidal hydrosol composition containing nano-particles (or particles so small as to require measuring approximately within the range of nanometers (nm) or billionths of a meter) of silver metal. Preferably, said nano-particles of silver metal are smaller than 25 nm in size. Unlike the silver particles in conventional colloidal suspensions, these sub-colloidal nano-particles of silver metal are small enough to be absorbed by human tissue. The small size of the sub-colloidal nano-phase silver metal particles of this composition allow said silver metal particles to remain in solution without settling out as occurs in conventional colloidal suspensions where larger suspended silver particulates are used. The non-ionic nature of the silver in said composition results in the stability and non-reactivity of said silver. Said composition can be used in an ingestible liquid or gel as well as in topical salves, serums, sprays, gels, lotions, creams, and shampoos. The composition may also be used as a component of nasal sprays and eye wash compositions.

Neither the physical nor analytical chemical tests performed upon the sub-colloidal silver metal hydrosol provides any evidence that any ionic forms of silver metal are present, nor have any been found to form during the electrolytic processes herein described for this invention.

The silver moiety formed through use of this invention is best identified as an unsupported atomic form or an aggregate of silver atoms, rather than an ionic form, and that various modifications and variations can be made in the composition and method of the present invention without departing from the spirit or scope of the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for producing a stable, sub-colloidal, nano-phase silver metal hydrosol comprising the steps of:
   providing a vessel having an opening;
   placing distilled water as a working fluid in said vessel;
   providing a moveable wire-shaped electrode constructed from 99.9995% purity silver metal above said vessel and above said working fluid;
   immersing a plate-shaped electrode constructed from 99.9995% purity silver metal in said working fluid, said plate-shaped electrode completely immersed in said working fluid, from between 0.50 inches and 0.75 inches beneath the surface of said working fluid;
   providing a transformer;
   connecting a first shielded electrical lead having a first end to said transformer;
   connecting a second end of said first shielded electrical lead to said wire-shaped electrode;
   connecting a second shielded electrical lead having a first end to said transformer;
   connecting a second end of said second shielded electrical lead to said plate-shaped electrode;
   passing a 14,000-18,000 Volt alternating current from said transformer to establish a discharge arc between the silver wire-shaped electrode above the working fluid and plate-shaped electrode immersed in the working fluid wherein the separation distance of said arc is between 1.25 and 1.50 inches, said separation distance defining the distance between said wire-shaped electrode and said plate-shaped electrode; and
   producing subcolloidal sized silver metal particles in said working fluid from said discharge arc and said wire-shaped electrode and said plate shaped electrode.

2. The method of claim 1, including the steps of initially forming an arc between the first wire electrode and said plate electrode and moving said wire electrode forming said arc above the top surface of the working fluid to increase particle production.

3. The method of claim 2, wherein the recorded rate of the loss of weight of the silver from the wire-shaped electrode is maintained between 940 to 950 milligrams over a period of 250 to 275 minutes, the equivalent of a rate of loss of length of approximately 0.25 inches of silver wire from the wire-shaped electrode, equivalent to a weight loss of 225 to 250 mg per hour.

4. The method of claim 1, including the step of cooling the working fluid to maintain the temperature of the working fluid below 1000 degrees Fahrenheit.

\* \* \* \* \*